June 27, 1933.  J. L. CREVELING  1,915,295
CAR LIGHTING SYSTEM
Original Filed Oct. 29, 1929   2 Sheets-Sheet 1
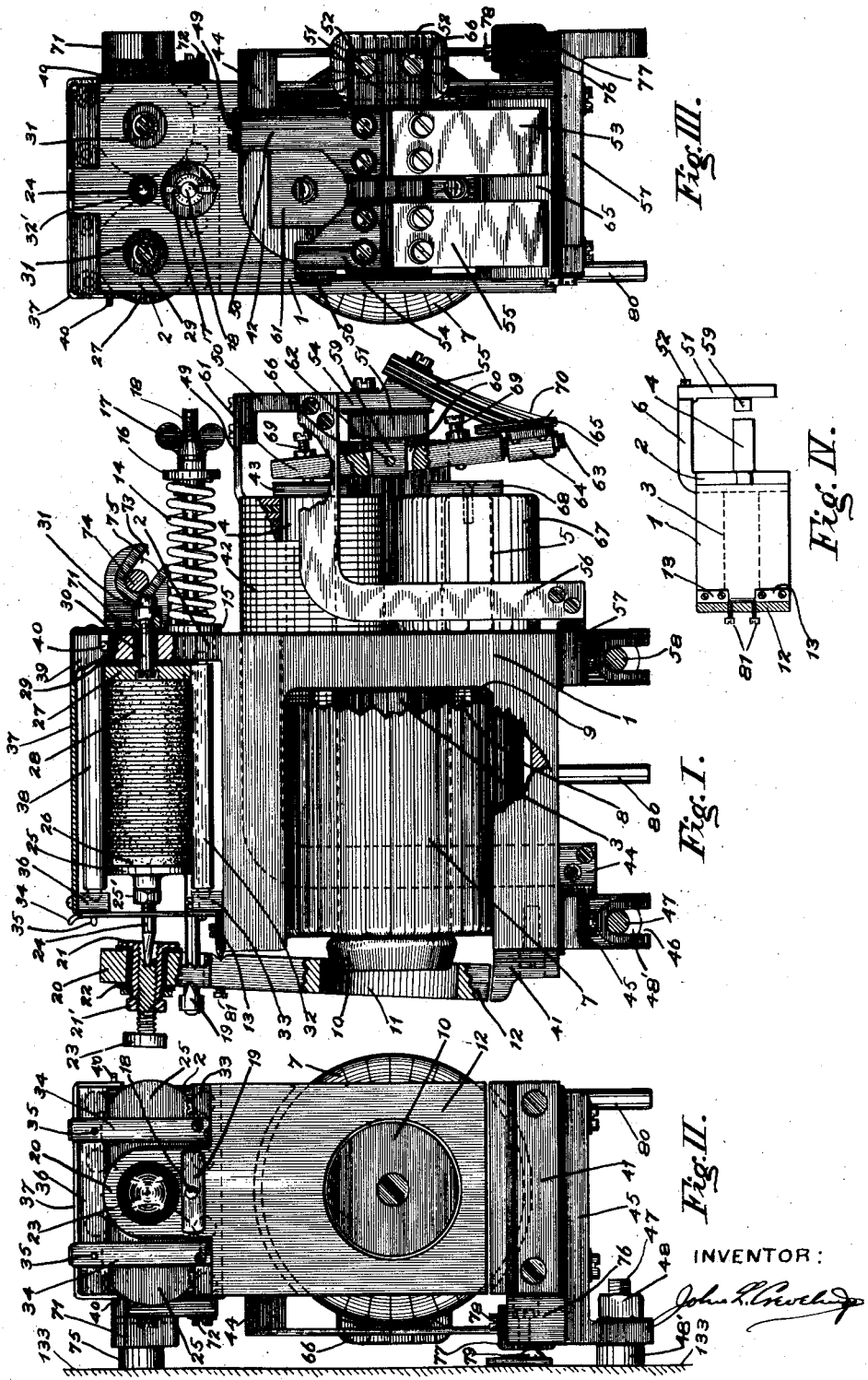
INVENTOR:
John L. Creveling June 27, 1933.  J. L. CREVELING  1,915,295
CAR LIGHTING SYSTEM
Original Filed Oct. 29, 1929   2 Sheets-Sheet 2
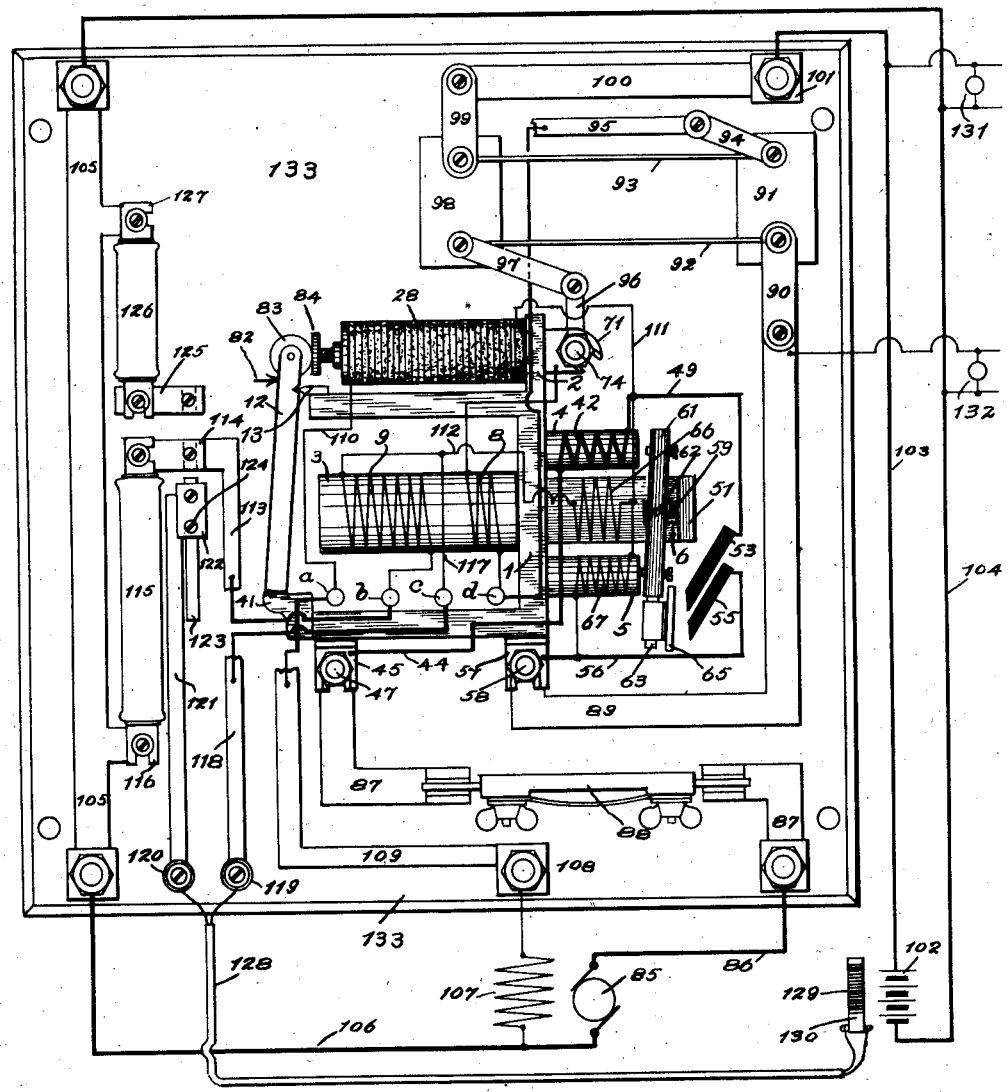
Fig. V.
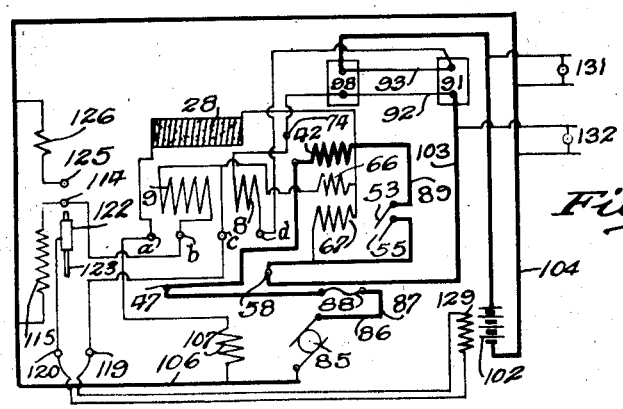
Fig. VI.
INVENTOR:
John L. Creveling Patented June 27, 1933

1,915,295

UNITED STATES PATENT OFFICE

JOHN L. CREVELING, OF NEAR TUCSON, ARIZONA

CAR LIGHTING SYSTEM

Application filed October 29, 1929, Serial No. 403,176. Renewed April 7, 1932.

My invention pertains to that class of electric car lighting wherein a dynamo driven from the car axle is used to supply current to a storage battery and translating devices, which devices are maintained by the battery when the dynamo is operating at low speed or at rest.

My invention has for one of its objects to provide a simple, effective and inexpensive means for properly regulating the dynamo throughout the speed changes which it suffers upon changes in speed of rotation of the car axle or its driving means. Another object of my invention is to provide a simple and effective means for connecting the dynamo with the storage battery when their electromotive forces are substantially equal so that the dynamo may then supply current to the system, and for disconnecting the dynamo and battery whenever the dynamo voltage tends to fall below that of the battery so as to prevent as nearly as possible any appreciable back discharge through the dynamo. Another object is to provide such a connecting and disconnecting means which will thus function, regardless of the voltage value of the battery, within limits of operation. Another object of my invention is to produce a combined structure for carrying out the above-mentioned objects, which may be of simple construction requiring very little accurate machine work, and of such character that it may be standardized and one type of instrumentality used to meet the requirements of a great number of cars having dynamos and storage batteries as well as loads of widely varying characters, so that, in the event that any of the regulators or switching devices fail to function properly at any time, they may be readily replaced by any one of a standard type which will perform the same functions intended to be performed by the one taken off, without requiring any adjustment for the particular use wherein the new regulator is placed. Other objects will be plain from the specification herewith.

In the drawings, Fig. I represents a front elevation and partial section of one type of regulating and switching mechanism which will be used to illustrate one embodiment of my invention;

Fig. II is an end elevation of the structure of Fig. I, as viewed from the left;

Fig. III is an end elevation of the structure of Fig. I, as viewed from the right;

Fig. IV is a top plan, on reduced scale, of a portion of the structure of Figs. I, II and III; and Fig. V is a diagrammatic representation of a system installed upon a car, embodying my invention, and assumed to include the regulating apparatus illustrated in Figs. I to IV, inclusive.

Fig. VI is a diagram showing the circuits of Fig. V.

In the drawings, 1 represents a magnetic field frame or structure provided with an upwardly extending member 2, a central core 3 and cores 4 and 5, as well as an off-set arm or extension 6, all of which may form an integral casting of magnetic material such as dynamo steel. In the embodiment here chosen for illustration, the core 3 is surrounded by an exciting coil structure 7 comprising an inner coil 8 of relatively coarse wire and an outer coil 9 of finer wire, as will be more fully explained. This core is provided with a pole-piece 10 registering with the aperture 11 within a movable armature or keeper 12, supported as by the knife edges 13 against which it is held by the compression spring 14, carried between the perforated bushing 15, supported by the member 2, and the bushing 16 abutting against the thumb nut 17, carried upon one end of the screw-threaded rod 18, the opposite end of which carries a yoke 19 provided with knife edges bearing upon the bottoms of V-shaped slots in the armature 12, as shown, and thus tending to rotate the armature about the knife edges 13 in a clockwise direction. The upper end of the armature 12 is provided with a contracted portion 20, carrying an internally threaded bushing 21, insulated therefrom as by the bushing 22, and into which is threaded the milled-headed screw 23, held in adjustment by nut 21', and having its inner end bored to form a socket for the rounded end of the rod 24 which carries a pressure plate 25, the position of which is determined by the nut 25' upon the rod 24. This pressure plate 25 preferably has attached thereto (though electrically insulated therefrom, if desired) a carbon plate of substantially its own configuration, indicated at 26, and between the carbon plate 26 and the two heavy carbon disks 27 there are confined the two sections of the carbon pile 28 which the spring 14 tends to compress and the pressure upon which, attraction of the armature 12 by the pole piece 10, tends to lessen. The end carbon disks 27 are insulated from the frame member 2, as indicated at 29, while screws 30 hold the members 27 in place and provide electrical connection of the same with the binding posts 31 for placing the carbon piles in circuit. The rod 24 extends through the insulating bushing 32' which forms the rear guide for the same. The carbon piles 28 rest upon glass tubes 32, supported by metal rods, indicated as passing therethrough and having one end engaging holes in the member 2 and the other end engaging holes in the block 33, screwed upon the top surface of the frame 1, as indicated. The block 33 carries two upright spring members 34, provided with holes adapted to engage the pins 35 in the member 36, carried by the cover member 37, which cover member carries the upper glass tubes 38 close to the upper side of the carbon disks so as to prevent the same from ever being shaken out of place, and is provided with a depending skirt 39 on each side, which skirts are notched to engage pins 40 carried by the member 2, so that by springing the members 34 off the pins 35 the entire cover structure, including tubes 38, may be readily removed so as to expose the carbon piles 28 and render them easily replaceable. The lower limb of the frame 1 is provided with a pole piece 41 so shaped as to form a small air gap between itself and the armature 12. The core 4 is surrounded by a heavy winding 42 which is indicated as an edgewise wound strip, the turns of which may be insulated by enamel. This coil is properly insulated from the core 4 and the frame 1 and is held in place by the pole piece 43 from which it is also insulated. The left-hand end of the coil is carried behind the frame, as shown in dotted lines, and the end, in view at 44, is electrically connected with the member 45 forming a bracket having an opening 46 therein which may be passed over the bolt or stud 47 and secured thereto as by means of the nut 48, clamping the same against a shoulder 48', when the regulator is placed in position for use, as will hereinafter be more fully pointed out. The member 45 is rigidly attached to the lower limb of the frame 1, as by screws as shown, and insulated therefrom as indicated. The other end 49 of the coil 42 is connected as by screws with the member 50, carried by and insulated from the member 51 which is attached to the projection or member 6, as by means of screws 52. The member 50 is provided with a brush 53, while the similar member 54 is provided with a similar brush 55 which is connected as by the conducting strip 56 with the member 57, similar to the member 45 which is also attached to the frame 1 and insulated therefrom, as shown, and adapted to pass over the bolt or stud 58 and be held upon the same by a proper nut similar to 48, when the device is in position for use. The member 51 is provided with a projection or boss 59 which passes through the opening 60 in the armature or keeper 61, which rotates about the pin 62 passing through the member 61 and the boss 59. These parts are so arranged that there is always an air gap between all sides of boss 59 and opening 60, and preferably so that the upper horizontal gap is smaller than the lower when 61 is in the position shown in Fig. I, and longer when 61 is in the position shown in Fig. V. The armature 61 carries at its lower extremity a post or stud 63 upon which is placed a member 64 having a slight rotatable motion, and preferably of insulating material, such as bakelite, which is fastened to a bridge member or conducting plate 65, adapted to cause connection between the brushes 53 and 55 when in the position shown in Fig. I, and to break this connection when rotated in a clockwise direction as indicated in Fig. V. The member 6 is surrounded by a winding 66 which is slipped over the member 6 and held in place as by the member 51, and which when energized tends to magnetize the members 6, 51, 59 and 61, as will hereinafter be pointed out. The core 5 is surrounded by a coil of fine wire 67 which is properly insulated from the core and held in place as by the pole piece 68. The rotating movement that may be given to the armature 61 is adjustable as by means of the screws 69 of non-magnetic material, and the brushes 53 and 55 are each provided with a light flexible brush 70 which makes contact with the member 65 when 61 is rotated in a counter-clockwise direction before the member 65 touches the remainder and less flexible portion of the brushes, for a purpose that will hereinafter be pointed out. The projection 2 of the main field frame carries a lug 71 attached thereto, as by screws 72, and insulated therefrom as indicated, and lug 71 has an opening therein as indicated at 73 adapted to pass over the stud or bolt 74 provided with the boss 75 against which 71 may be drawn by a nut similar to the one shown at 48. The members 45 and 57 have attached thereto a bar or block of insulating material 76 which carries a series of independent contact members, as shown at 77, which in this instance are four in number. Each of these is provided with a binding screw 78 whereby it may be connected with proper windings of the device, as will hereinafter be pointed out, and each is adapted to automatically form a proper connection with its corresponding spring bolt or contact member indicated at 79, carried by the backboard 133 when the regulator structure is mounted upon the studs supporting the same. Thus, the arrangement of the members 45, 57 and 71 and their supporting bolts 47, 58 and 74 is such that, when the said members are placed over their respective bolts and the nuts upon the bolts are drawn up, the entire structure is held in its proper operative position, and the members 77 engage their proper connecting spring members 79 and the entire structure is electrically connected as well as mechanically held in place, as will hereinafter more fully appear. I preferably arrange the said bolts and the openings in the said lugs so that in placing the structure upon its supports it may first, while rotated somewhat out of the horizontal, in a counter-clockwise direction, have the opening 46 slipped over the bolt 47. Then, if the structure be allowed to rotate in a clockwise direction, in virtue of its own weight, it will properly engage the bolts 58 and 74, as such an arrangement makes for ease in application, in an obvious manner. The frame 1 is provided with a post or leg 80, so that when removed from its supports it will rest evenly upon a horizontal surface, since the bottoms of the lugs 45 and 57 and the leg 80 provide three points in the same plane for the device to rest upon.

In the structure of Figs. I, II and III, it is, of course, necessary that the armature 12 shall have no lateral movement when attracted by the pole piece 10, and one way of accomplishing this and providing some lateral adjustment is indicated in Fig. IV where the knife-edge members 13 are shown as carried upon the upper surface of the member 1 and extending only part way across the same, while the armature 12 is shown as provided with pointed screws 81 passing through the armature and contacting with the knife-edges at their points nearest the center.

In Fig. V, the structure of Figs. I to IV, inclusive, is shown more or less diagrammatically as mounted upon its proper board 133, connected with the car wiring and carrying certain instrumentalities which cause any one of my standardized regulators to perform its proper functions with respect to the particular equipment of the car to which it is applied in service, and it will be noted that the various windings are indicated as connected in circuit and that only one carbon pile is shown for sake of clearness in illustration, it being obvious that the two connected in series as shown in Figs. I to III are portrayed by this diagrammatic arrangement. The spring 14 and its cooperating parts tending to hold the armature 12 in place and rotate the same in a clockwise direction and compress the pile are merely indicated by the arrow 82 representing diagrammatically the force applied by the spring. The armature 12 is merely indicated as having at its upper extremity a roller or sheave 83 which presses against the head of the adjustable screw 83 so as to apply pressure upon the pile 28, which is a form of arrangement that may be used in place of the one shown in Fig. I, and which is simpler to show in diagram. It will also be noted that the brushes 53 and 55 are shown as one above the other to diagrammatically indicate the arrangement more plainly shown in Figs. I and III, and that the switch is shown as open, since the contacts with the brushes are broken. In this figure, the buss bars and all connections are indicated as upon the face of the board 133, and where complete illustration would lead to confusion, on account of these members being back of parts of the device, the said members are indicated as broken and the connections indicated merely by lines, for sake of clearness. In Fig. VI most of the apparatus has been omitted to more clearly show the circuits of the system.

With the arrangement here illustrated in Fig. V, it will be noted that four contacting members, as shown at 77—79 in Figs. II and III, are required, and these are merely indicated diagrammatically at $a$, $b$, $c$ and $d$, and assumed to be connected in the manner shown by the lines indicating the electrical connections upon the drawings, as will more plainly appear. And while the system will here be explained with respect to Fig. V, reference may be had to Fig. VI for assistance in following the various circuits. In Fig. V, 85 indicates the dynamo or generator connected with the car axle and provided with some means (now well-known and forming no part of my present invention) whereby the current supplied by the dynamo is of uniform direction, regardless of direction of movement of the car. The positive brush of the dynamo 85 is connected as by lead 86 with the positive buss 87, as indicated, which has inserted therein the usual main fuse mounted upon the insulating block 88 and removably placed in circuit by the usual knife blades and clips. When the regulating structure is placed upon its proper studs and the nuts drawn up, 87 is then in electrical communication with the member 45 which is electrically connected as by 44 with one end of the winding or coil 42, the opposite end of which is connected as by 49 with the brush 53, as has been previously pointed out. The brush 55 is then connected through the instrumentality of strap 56 and the member 57 with the buss 89, connected as by means of the removable link 90 with one side of the plate or member indicated at 91 and one end of the wire 92. The other side of the plate 91 and one end of wire 93 are connected as by the link 94 with the connecting strap 95 which is in electrical connection, as indicated, with the right-hand automatic spring connecting device $d$, including a connector 79 mounted upon the board as shown in Fig. II, engaging a member 77 of the type indicated in Figs. II and III, which is connected with one end of the coarse winding 8, the opposite end of which is connected with the lug 71, held in place upon the board 133 by the stud 74, to which is connected the conducting strap 96, carrying the link 97, connected with the lower side of the plate 98 and the wire 92. The upper side of the plate 98 and one end of the wire 93 are connected by the link 99 with the remaining portion 100 of the positive buss terminating in the connecting post indicated at 101, with which is connected the positive side of the storage battery 102, by the usual wiring of the car 103. The negative side of the battery is connected as by wire 104 with the upper connector of the negative buss 105, the lower connector of which is connected by wire 106 with the negative side of the generator 85. The field winding of the generator is indicated at 107 as having one of its terminals connected with the negative lead 106, while the other is attached to the connector 108 upon the board, having connecting strip 109 carried to the left-hand automatic connection $a$, of the type above pointed out as shown at 77—79 in Figs. II and III. The portion 77 of such connection is connected as by wire 110 with one end of the carbon pile 28, the opposite end of which is connected as by wire 111 with the end 49 of the winding or series magnet 42, and is thus connected through the winding 42 and leg 45 to the positive buss 87 in connection with the positive side of the generator. It will thus be seen that the field winding 107 is at all times across the generator through the carbon pile 28 and the winding 42 when the regulator is mounted in place upon the board 133 and operative. The coil 66 upon the limb 6 has one of its ends in electrical connection with the end 49 of the winding 42, and its opposite end is connected as by wire 112 with one end of the principal energizing winding or coil 9, the opposite end of which is connected with the connecting device $b$, as indicated, the stationary member 79 of which is connected with the strip 113, which in turn connects with the post or block 114, arranged to carry one end of the resistance unit 115, the opposite end of which is connected as by 116 with the negative buss 105. Therefore, the coils 66 and 9 may be considered as in series with each other and in shunt across the generator through the coil 42 and as having in series therewith the resistance unit 115. The wire 117 is connected with the wire 112 at a point between the coils 9 and 66, and is carried to the members $c$, as indicated, the stationary part of which is connected with the strip 118 which ends in the binding post 119. A similar binding post is arranged at 120 and connects with the strip 121, terminating in the post or lug 122, through which is fitted a sliding bolt or rod 123 which may be held in place as by screws 124. This bolt is capable of being passed through the openings indicated in dotted lines in the post 114 and the post 125, so as to connect the same together and with the strap 121. Post 125 carries one end of a resistance unit 126, which is connected as at 127 with the negative buss 105. The posts 119 and 120 are connected as indicated by the twin conductor 128 with the binding posts connecting with the ends of the winding 129, preferably of fine iron wire, carried by the tube or member 130 and placed in proximity to the battery 102 so as to be subjected to the same temperature changes as the battery, for a purpose as will hereinafter appear. The load circuit supplying the lamps or other translating devices may be connected either as indicated at 131 or as indicated at 132. With the former arrangement, all current passing from the generator to the battery and translating circuit will pass through the blocks and wires connecting the same, indicated at 91, 92, 93 and 98; while with the latter arrangement the battery current will pass through the blocks and their connections, while the translating circuit current is obviously tapped off from the generator buss before it reaches this device.

An operation of my invention will be plain from the following:

Assuming the dynamo 85 to be at rest or operating at quite low speed and the main switch open, as shown in Fig. V, the translating devices, if arranged as shown at 131, may be supplied directly from the battery through the mains 103 and 104; or, if the translating devices be connected as indicated at 132, they may be supplied by the battery in a similar manner, save that the current from the battery through main 103 will pass through the positive buss 100, link 99, device 98—93—92—91 and link 90. It will, of course, be obvious that either of these arrangements may be used for the work circuit or separate circuits may be taken off by means of each type of connection, if desired. Whether the translating devices be off or on, some current will also flow, in the manner just above mentioned, through link 90 to the buss 89 and stud 58 to the bracket 57, and from conductor 56 through the coil 67 to the conductor 49, and thence through the coil 42 and conductor 44 to the bracket 45 and stud 47, and then through the positive buss 87 in which the fuse-carrying device 88 is interpolated, and thence through lead 86 to the generator 85, from which return is made through the lead 106, buss 105 and wire 104 to the battery 102. The coil 67 is preferably made of relatively very fine wire and, therefore, having a high resistance, a very small current passes through the same when the generator is inoperative; and, from a standpoint of waste, this is substantially negligible, though of some service in causing the generator to build up properly when its armature is revolved. This current passing through the coil 67 attracts the lower end of the armature 61 and firmly holds the armature in the position indicated in Fig. V, breaking the main circuit at the brushes 53—55 and locking the switch against any accidental closing thereof. If, now, the generator 85 have its armature revolved at sufficient speed, some current will soon flow through the lead 86, buss 87, bracket 45, conductor 44 and coil 42 to the conductor 49, and thence through wire 111 to one end of the carbon pile or regulating element 28, from which return is made through wire 110, connector $a$ (comprising elements 77—79 of Fig. II), conducting strip 109 and post 108 to the field 107, which will tend to build up the voltage of the generator in a well-known manner. Some current will also flow from the conductor 49 to one end of the coil 66, and thence through the coil and wire 112 to one end of the coil 9, and from the opposite end thereof through its connector $b$ to the strap 113, and thence through resistance unit 115 to the negative buss 105 and to the generator through lead 106. The coil 66 thus tends to magnetize the arm or bracket 6 together with members 51—59 and armature 61, and the windings are so arranged that this current tends to set up a flux through the member 6 in the same direction as that set up by the coil 67 when the generator voltage is below that of the battery and battery current is discharging through the coil 67. Therefore, while the generator is running and its voltage is below that of the battery, coil 66 and coil 67 cooperate to hold the switch open. As noted above, the current to the field and also the current through coil 66, as it comes from the generator, passes through the coil 42 having relatively very few turns of a heavy conductor, and this winding 42 is in such direction that this current tends to set up a flux cooperating with the coil 66 to tend to attract the upper end of the armature 61 and close the switch. Owing, however, to the small number of turns in the coil 42 and the relatively high resistance of the field 107, this action is quite weak until the generator has built up a voltage in the neighborhood of its normal operating value. As the generator voltage rises, the current in the coil 67, which is in effect across the brushes 53—55, will decrease, and when the voltage of the generator and battery are equal will fall to zero; and the coil 67 will then become inoperative and, upon a very slight rise in voltage of the generator above that of the battery, will have its current reversed so as to tend to lessen the pull upon the lower end of armature 61 and increase the pull upon the upper end, so as to, in effect, tend to "repel" the lower portion of the armature 61 and close the switch by moving the plate 65 into contact with the brushes 53—55. Further, as above pointed out, there will be a relatively small current flowing through the coil 42, tending at this time to close the switch by attracting the upper portion of the armature 61. And, by properly adjusting the air gaps at the upper and lower portions of the armature 61, as by means of the screws 69 provided for this purpose, I can cause this switch to close when the generator voltage is substantially equal to that of the battery 102, or very slightly above or below the same, as may be desired, throughout wide variations in battery voltage. In practice, I usually prefer to so adjust this switch that when the current through 67 is substantially zero, the current then flowing through the coil 42 alone, or with an exceedingly slight reverse current in 67 cooperating therewith, will swing the armature 61 in a counter-clockwise direction until the bridging member 65 comes into contact with the light flexible brushes 70, shown in Fig. I. At this time, the generator is connected with the battery and their voltages are practically equal and a very small current flows through the light flexible brushes 70. This small current, of course, flows through the winding 42, and this together with the current already flowing therethrough, combined with the effect of the reduction in the air gap between the pole piece 43 and the upper end of the armature 61, then serves to cause the upper end of the armature 61 to tend to draw more closely toward the pole piece 43 of core 4, and a very slight rise in generator voltage, causing only a relatively small current through the weak brushes 70, will cause the bridging member 65 to be brought into contact with the main portions of the brushes 53—55. Then, if the generator voltage still rises, it will supply increasing current to the battery through coil 42, conductor 49, brush 53, bridging member 65, brush 55, conductor 56, buss 89, link 90, plate 91, wires 92—93 and plate 98, link 99, buss 100, main 103 and battery 102; and return from the battery will be made through wire 104 to the negative buss 105 and thence through lead 106 to the generator. This current, all passing through the coil 42, will tend to more strongly attract the upper end of the keeper 61 so as to flex the main brushes 53—55, and the upper end of the armature 61, by approaching the pole piece 42 and closing the gap, will be capable of exerting a very heavy pressure upon the brush contacts (increasing as the current increases) so as to prevent heating while the said contacts are carrying any current to be met in the ordinary operation of the system, as the gap, adjustable by the upper screw 69, may be very small under these circumstances. Should the speed of the generator now decrease, the current through coil 42 will fall off and gradually allow the elasticity of brushes 53—55 to increase the air gap between pole piece 43 and armature 61; and, when the current has been reduced to zero, the only contacts closed by 65 will be with the light flexible brushes 70, and the armature 61 will be in such position that the top and bottom air gaps will not be of greatly different length. If the generator voltage then fall very slightly, a very slight back discharge through 42 will cause the switch to open. Or, if the speed now rise so as to cause a small increase of generator voltage over that of the battery, the switch will close again as outlined above. However, if the generator speed fall quite low, then the switch will be locked open by the back discharging current through 67, as previously pointed out.

The current supplied to the coil 66 while the generator is operative, as above outlined, passing through the coil 9, tends to magnetize the main regulator core 3 and send a flux through the frame 1 which divides at the upper and lower branches of the said frame and returns through the armature 12 and across the airgap caused by the opening 11, and thence to the pole piece 10 and core 3, or vice versa. The direction of the winding of this coil 9 is such, with respect to the winding 66, that the said windings assist each other in forcing a flux through the vertical portion of the frame 1; or in other words, I find it advantageous to have the windings 9 and 66 each tending to set up a flux toward the member 1 or each tending to set up a flux in the opposite direction. And it is obvious that the winding 9 may be the last connected into circuit and have this arrangement fulfilled without disturbing any of the relationships of the windings upon the switch-operating coils, above pointed out, by merely connecting the proper ends of the coil 9 into circuit. The current through coil 9, when the connecting member or bolt 123 is in the position shown in the drawings, all passes through the resistance unit 115, and this may, by having a zero temperature co-efficient, act as a so-called "swamping resistance" to prevent temperature rise, due to current in coil 9, from materially affecting the current in said coil, in a way now well-known in the art and requiring no further discussion. With the proper value of resistance at 115, I so adjust the opposition to the pull of coil 9 upon the armature 12, by adjusting the pressure exerted by the spring 14 through the instrumentality of wing nut 17, that the armature 12 will not be rotated counter-clockwise to materially relieve the pressure upon the pile 28 and materially increase its resistance until the generator voltage is sufficient to charge the battery. And I usually find it expedient to so design and adjust the regulator that, when affected by the coil 9 alone, it will hold the generator voltage constant throughout speed changes above the "critical speed" (necessary to bring the generator to proper voltage), at a value substantially equal to that of a fully charged battery,—though this is not always necessary in this system, as will be pointed out. With such an adjustment and the regulator operated by coil 9 alone, as assumed above, the battery will not be over-charged by the generator, even on long daylight runs, since its voltage rises at the end of its normal charge and will thus tend to terminate the same in a manner now well-known in the art. Now, the current to the battery, in the above operation, all passes through the device or shunt supported by the links 90 and 99, and will have two principal paths between said links. That is, the current will divide at 90 and part flow through 92 and 98 to 99, while part will flow through 91 and 93 to 99. Now, for sake of simplicity in illustration, if we assume the resistance of each of the members 91—92—93 and 98 to be equal and constant, there will then be no difference in potential at any time across the junctions connected with 94 and 97, and no current will flow either from 94 through 95, connecting device $d$, coil 8, lug 71, connector 96 and link 97, or in the reverse direction; and coil 8 will produce no effect upon the system under such conditions. However, by either lowering the resistance of 91 and 98 or increasing the resistance of 92 and 93, we can cause a current to flow from 94 through coil 8 and back to 97, in the circuit above outlined, and this current will be further increased if we both decrease the resistance of 91 and 98 and increase that of 92 and 93. This last-named effect may easily be brought about automatically by the current flowing through the device, if 91 and 98 have a negative temperature coefficient and 92 and 93 have a positive temperature coefficient. Further, if we make the resistance of 91 and 98 somewhat higher than 92 and 93, at a given operating temperature, the current through 8 will be in the reverse direction to that above pointed out, so long as the device remain below the assumed temperature. It is therefore plain that we may so design and adjust the shunt and the coil 8 that when the current through the shunt is below a certain value a portion of the total current will traverse coil 8 in a direction magnetically opposed to the flux of coil 9, and thus increase the current toward a desired maximum value. Also, it is plain that we may so adjust the arrangement that, when a desired current is flowing through the shunt, the thermal effect of this current will cause the shunt, in effect a Wheatstone bridge, to "balance", and coil 8 will then receive no current and play no part in the regulation, while current in excess of this "balancing" value will cause current to flow through coil 8 in such direction as to assist coil 9 and cause the output of the generator to be cut down. In practice, I find it desirable to make the members 91 and 98 of carbon, and they may take the form of plates, as shown in Fig. V; and, by making the co-operating conductors 92—93, which may take the form of wires in a system of this type, of iron, I not only carry out the above-mentioned effects but a further desirable one, of causing the current through 8 in the direction to lessen the generator voltage to rise much more rapidly after a certain current value is reached than upon fluctuations below this value, on account of the temperature coefficient of iron rising with its temperature. And, if desired, I may even work the iron wires near the "critical temperature" and take advantage of this widely disproportionate rise in resistance, though this is not ordinarily required. Thus, by properly designing and adjusting the system, I can cause coil 8 to assist in holding up the desired charging current and also cause it to prevent the current from appreciably exceeding a predetermined value, which value may depend almost entirely upon the design of the shunt.

In practical car lighting service, both lead-acid storage batteries and Edison alkaline batteries are used, and when lead batteries are used the now standard practice is to use sixteen cells, the capacity of which is varied to suit the requirement of the individual cars, and usually varies from 25 amperes to 100 amperes charging rate. The field current of the generators for these various outputs never exceeds a value necessitating any larger carbon pile for the greatest output than is desirable from certain standpoints for the smaller, and it is a simple matter to make the regulators with a standard pile to meet all outputs now encountered. The main switch, including the series coil 42, has to carry the entire current generated, and it is a simple matter to standardize this so that any switch will carry the maximum met in practice, as coil 42 only needs a few turns. Therefore, in the system as above pointed out, the regulating and switch structures (Figs. I, II and III) may be standardized and all alike and adapted to the requirements of a particular car by having a proper resistance unit 115 and a proper shunt 91—92—93—98 to "dictate" to the standard regulator what it shall do.

With a lead battery upon a car, the normal charging voltage need not rise materially above 39 volts or 40 volts, and this remains practically constant for all temperatures to which the battery is exposed in ordinary service. However, when an Edison battery having the same useful discharge voltage is substituted, it requires about 43 volts to properly charge the same in the summer, about 45 volts during spring and fall temperature, and 47 to 50 volts during the cold winter months. To cause the same standard regulator to automatically meet these conditions, the regulator board of the car is provided with the resistance unit 126 and the connecting device 123, while the temperature compensating device 129 is placed outside the car, preferably near the battery so as to be exposed to the same temperature changes. When the Edison battery is applied to the car, all that then needs to be done is to loosen screws 124 and push the connector 123 through the holes provided for the purpose in the members 114 and 125 and tighten the screws. This throws the device 129 into circuit across the coil 9 so as to shunt some of the current away from the coil through the following circuit: from wire 112 (or one end of coil 9) through wire 117 to connector c, thence through 118, one wire 128, device 129, one wire of 128, connecting strip 121, lug 122 and member 123 to lug 114, which is in connection with the other end of coil 9 through member 113 and connector b. This shunt around coil 9, obviously will weaken its effect, owing to resistance 115, and cause it to hold a higher voltage throughout speed changes upon the system, which voltage will increase as the temperature of the device 129 and the battery decreases if 129 have a positive temperature coefficient. And I find that, with a device 129 comprising merely a coil of fine wire or copper or, better, nickel or, even better, pure iron, I can cause the voltage held by the regulator to vary with the temperature of the battery, with sufficient accuracy for all practical purposes if the proper adjustment be made.

I find it usually advantageous to so arrange and adjust the above devices that throwing the shunt, or temperature compensating device, around the coil 9 will raise the voltage setting of the regulator somewhat higher than will be desired in practice. Then, by placing a proper resistance unit 126 in multiple with 115, as by connecting the same by means of the device 123—122—114 and 125, the proper value of voltage may readily be adjusted to be automatically held upon an Edison battery throughout temperature changes, as above pointed out.

From the foregoing it will be noted that the voltage to be held by the regulator, when unaffected by current, may be adjusted within the limits of practice by proper selection of the resistance unit 115, and the amount of compensation afforded for temperature changes when an Edison battery is used may be controlled by proper selection of the compensating device 129 and resistance unit 126; also that the current output to be permitted by the regulator may be controlled by proper selection of the shunt device 91—92—93—98, and that these determining instrumentalities are all carried by the back board 133 so as to really belong to the car wiring system, as distinguished from the regulator and switch structure proper which may be removed from the car upon loosening the nuts upon the studs 47—58 and 74, and a like regulator may be substituted by merely placing it upon the studs and tightening the nuts. Therefore, if each car is provided with proper determining devices, as above pointed out, for its particular requirements, a single standard type of regulator-switch mechanism may be used and all may have the same standard adjustment, and, therefore, readily interchangeable. On this account, it will not be necessary to adjust or repair regulators or switches upon a car, but simply necessary, at points of inspection, to have some spare regulator and switch units properly adjusted to a uniform standard. As these are small devices, in the type here shown, it is merely a "one man job" of only a few minutes to exchange the regulator devices, and does not, therefore, interfere with the service of the car. Further, since the regulators are all alike in adjustment and operation, a standard type of temperature compensating device and a standard type of current controlling or bridge element, as well as voltage adjusting unit, may be used and all properly calibrated, for the use intended, at the factory.

Like voltage units 115, temperature compensating units 129, and current control units 91—92—93—98, will therefore not only be interchangeable to cause the regulators to produce like results, and thus obviate the necessity of making any repairs or adjustments of units upon a car, but if it is desired to change the voltage load or temperature compensating characteristics of any car, as upon change of the battery or change in class of service, it may be done by merely changing the proper units and putting in ones that will give the required characteristics, which may readily be predetermined. And, therefore, if properly calibrated and marked, spare units kept at inspection points may be substituted readily to replace defective ones or to change the operating characteristics of the system in a definite, predetermined, manner, if desired.

While I have here shown and described in detail particular types of regulator, main switch, current control, and voltage control in response to temperature at the battery each of which I consider as comprehending an invention of mine, per se, these separate inventions are not here specifically claimed, as they are covered in my co-pending applications 351,377, filed Mar. 30, 1929, for improvement in Electric regulators; 668,800, filed May 1, 1933, for improvement in Electric systems; 378,663, filed July 16, 1929, for improvement in Electric regulation; and my Patent 1,850,449, of Mar. 22, 1932, for improvement in Electric regulation, respectively.

I do not wish in any way to limit myself to any of the details of construction or modes of operation herein given to illustrate an embodiment of my invention, for it will be obvious that wide departure in the way of details, both in construction and operation, may be made without departing from the spirit and scope of my invention which is as set forth in the following claims.

I claim:

1. In a car lighting system, a regulator unit for controlling the operation thereof, quick detachable means for carrying said unit and simultaneously connecting the same in circuit and cooperating connecting means affected thereby.

2. In a car lighting system, a regulator unit for controlling the operation thereof and quick detachable means for carrying said unit and simultaneously connecting the same in circuit, said carrying means having in circuit therewith means determining the operation of said regulator.

3. In a car lighting system, a regulator unit for controlling the operation thereof and quick detachable means for carrying said unit and simultaneously connecting the same in circuit, said carrying means having in circuit therewith means determining the operation of said regulator and adapting the operation thereof to the requirements of the particular car containing the carrying means.

4. In a car lighting system, a regulator unit for controlling the operation thereof and quick detachable means for carrying said unit and simultaneously connecting the same in circuit, said carrying means having in circuit therewith means determining the operation of said regulator and adapting the operation thereof to the requirements of the particular car containing the carrying means whereby a plurality of cars having different requirements may have the same met by like regulators cooperating with different determining means upon said cars.

5. In a car lighting system, a regulator and cooperating switch forming a unit for controlling the operation thereof, quick detachable means for carrying said unit and simultaneously connecting the same in circuit and cooperating connecting means affected thereby.

6. In a car lighting system, a regulator and cooperating switch forming a unit for controlling the operation thereof and quick detachable means for carrying said unit and simultaneously connecting the same in circuit, comprehending connecting means having in circuit therewith means determining the operation of said regulator.

7. In a car lighting system, a regulator and cooperating switch forming a unit for controlling the operation thereof and quick detachable means for carrying said unit and simultaneously connecting the same in circuit, comprehending connecting means having in circuit therewith means determining the operation of said regulator and adapting the operation thereof to the requirements of the particular car containing the carrying means.

8. In a car lighting system, a regulator and cooperating switch forming a unit for controlling the operation thereof and quick detachable means for carrying said unit and simultaneously connecting the same in circuit, comprehending connecting means having in circuit therewith means determining the operation of said regulator and adapting the operation thereof to the requirements of the particular car containing the carrying means whereby a plurality of cars having different requirements may have the same met by like regulators cooperating with different determining means upon said cars.

9. In a car lighting system, a combined regulator and magnetically cooperating switch forming a unit for controlling the operation thereof, quick detachable means for carrying said unit and simultaneously connecting the same in circuit and cooperating connecting means affected thereby.

10. In a car lighting system, a regulator unit for controlling the operation thereof and quick detachable means for carrying said unit and simultaneously connecting the same in circuit, comprehending connecting means having in circuit therewith means determining the operation of said regulator and adjusting the same in accordance with temperature changes.

11. In a car lighting system, a regulator unit for controlling the operation thereof and quick detachable means for carrying said unit and simultaneously connecting the same in circuit, comprehending connecting means having in circuit therewith means determining the operation of said regulator and adapting the operation thereof to the requirements of the particular car containing the carrying means and in response to temperature changes.

12. In a car lighting system, a regulator unit for controlling the operation thereof and quick detachable means for carrying said unit and simultaneously connecting the same in circuit, comprehending connecting means having in circuit therewith means determining the operation of said regulator and adapting the operation thereof to the requirements of the particular car containing the carrying means and responsive to temperature changes whereby a plurality of cars having different requirements with respect to load and temperature changes may have the same met by like regulators cooperating with different determining means upon said cars.

13. In a car lighting system, a regulator unit for controlling the operation thereof and quick detachable means for carrying said unit and simultaneously connecting the same in circuit, comprehending connecting means having in circuit therewith means determining the operation of said regulator and including a current reversing element.

14. In a car lighting system, a regulator unit for controlling the operation thereof and quick detachable means for carrying said unit and simultaneously connecting the same in circuit, comprehending connecting means having in circuit therewith means determining the operation of said regulator and including a static current reversing element.

15. In a car lighting system, a regulator unit for controlling the operation thereof and quick detachable means for carrying said unit and simultaneously connecting the same in circuit, comprehending connecting means having in circuit therewith means determining the operation of said regulator and including a current reversing element affected by current flowing in one direction only.

16. In a car lighting system, a generator driven at variable speed and a battery charged thereby, means for connecting and disconnecting the generator and battery when their voltages are substantially equal throughout changes in battery voltage, and a regulator for the generator compensating for speed changes thereof combined in a unitary structure with and cooperating with said connecting means.

17. In a car lighting system, a generator driven at variable speed and a battery charged thereby, means for connecting and disconnecting the generator and battery when their voltages are substantially equal throughout changes in battery voltage, and a regulator for the generator compensating for speed changes thereof combined in a unitary structure with and cooperating with said connecting means, temperature affected means carried by the car, and means whereby it may be caused to affect the regulator.

18. In a car lighting system, a generator driven at variable speed and a battery charged thereby, means for connecting and disconnecting the generator and battery when their voltages are substantially equal throughout changes in battery voltage, a regulator for the generator compensating for speed changes thereof combined in a unitary structure with and cooperating with said connecting means, temperature affected means carried by the car, and means whereby it may be caused to affect the regulator to compensate for changes in temperature of the battery.

19. In a car lighting system, a generator driven at variable speed and a battery charged thereby, means for connecting and disconnecting the generator and battery when their voltages are substantially equal throughout changes in battery voltage, a regulator for the generator compensating for speed changes thereof combined in a unitary structure with and cooperating with said connecting means, current affected means carried by the car and means whereby it may affect the regulator upon changes in generator current.

20. In a car lighting system, a generator driven at variable speed and a battery charged thereby, means for connecting and disconnecting the generator and battery when their voltages are substantially equal throughout changes in battery voltage, a regulator for the generator compensating for speed changes thereof combined in a unitary structure with and cooperating with said connecting means, current affected means carried by the car and means whereby it may affect the regulator in opposite senses upon changes in generator current in a uniform direction.

21. In a car lighting system, a regulator unit for controlling the operation thereof and quick detachable means connecting the same in circuit, said means having in circuit therewith means determining the operation of the regulator and adapting the operation thereof to the requirements of the particular car carrying the connecting means.

22. In a car lighting system, a regulator unit for controlling the operation thereof and quick detachable means connecting the same in circuit, said means having in circuit therewith means determining the operation of the regulator and adapting the operation thereof to the requirements of the particular car carrying the connecting means, whereby a plurality of cars having different requirements may have the same met by like regulators cooperating with different determining means carried by the respective cars.

23. In a car lighting system, a regulator and cooperating switch forming a unit for controlling the operation thereof, and quick detachable means for carrying the said unit and simultaneously connecting the same in circuit, comprehending connecting means having in circuit therewith independently carried replaceable means determining the operation of said regulator.

24. In a car lighting system, a regulator and cooperating switch forming a unit for controlling the operation thereof, and a backboard provided with quick detachable means for carrying said unit and simultaneously connecting the same in circuit, said backboard carrying connecting means having in circuit therewith means determining the operation of said regulator and adapting the operation thereof to the requirements of the particular car containing the backboard.

25. In a car lighting system, a regulator for controlling the operation thereof and a backboard provided with quick detachable means for connecting the regulator in circuit, said backboard carrying connecting means having in circuit therewith means determining the operation of said regulator and adapting the operation thereof to the requirements of the particular car containing the backboard.

26. In a car lighting system, a regulator and cooperating switch forming a unit for controlling the operation thereof, a mounting device comprising quick detachable means for carrying said unit and simultaneously connecting the same in circuit, said device being provided with connecting means and means in circuit therewith determining the operation of said regulator and adapting the operation thereof to the requirements of the particular car containing the mounting device, whereby a plurality of cars having different requirements may have the same met by like regulators cooperating with different determining means carried by the mounting devices upon said cars.

27. In a car lighting system, a combined regulator and magnetically cooperating switch forming a unit for controlling the operation thereof, a mounting device provided with quick detachable means for carrying said unit, means controlling the operation of the regulator, and means simultaneously connecting the same in circuit.

28. In a car lighting system, a plurality of cars each equipped with an axle-driven dynamo, a battery to be charged thereby, a mounting device provided with means for connecting a regulator in circuit to control said generator, means for connecting a determining device in circuit to adjust the operation of the regulator combined with an automatic regulator engaging the first-mentioned means and thus rendered operative to regulate the generator, and a determining device engaging the second-mentioned means and thus rendered operative to adjust the operation of the regulator to the requirements of the particular battery upon each car.

JOHN L. CREVELING.